US012344522B2

(12) United States Patent
Hsu

(10) Patent No.: US 12,344,522 B2
(45) Date of Patent: Jul. 1, 2025

(54) MANUALLY OPERATED DUAL-ACTION SUCTION/DELIVERY FLUID PUMP AND COMPONENT ASSEMBLY THEREOF

(71) Applicant: Heng-Yi Hsu, Tainan (TW)

(72) Inventor: Heng-Yi Hsu, Tainan (TW)

( * ) Notice: Subject to any disclaimer, the term of this patent is extended or adjusted under 35 U.S.C. 154(b) by 0 days.

(21) Appl. No.: 18/474,967

(22) Filed: Sep. 26, 2023

(65) Prior Publication Data

US 2025/0100868 A1 Mar. 27, 2025

(51) Int. Cl.
*F04B 9/14* (2006.01)
*B67D 7/02* (2010.01)
*F04B 23/02* (2006.01)

(52) U.S. Cl.
CPC .............. *B67D 7/0205* (2013.01); *F04B 9/14* (2013.01); *F04B 23/02* (2013.01)

(58) Field of Classification Search
CPC . B05B 9/0816; B05B 9/0822; B05B 11/0097; F04B 33/00; B67D 7/0205
See application file for complete search history.

(56) References Cited

U.S. PATENT DOCUMENTS

| | | | | |
|---|---|---|---|---|
| 6,357,492 | B1 * | 3/2002 | Hsu | B67D 7/0205 141/26 |
| 7,367,366 | B2 * | 5/2008 | Liao | F04B 33/00 417/86 |
| 8,052,402 | B2 * | 11/2011 | Sanders | F04B 33/00 417/315 |
| 8,240,433 | B2 | 8/2012 | Tseng | |
| 8,757,446 | B1 * | 6/2014 | Liu | B05B 9/043 222/153.04 |
| 8,858,189 | B2 * | 10/2014 | Wang | F04B 9/14 417/374 |
| 9,222,471 | B2 * | 12/2015 | Liao | F04B 39/14 |
| 10,641,254 | B2 | 5/2020 | Liao | |
| 11,073,140 | B2 * | 7/2021 | Chen | F04B 23/025 |
| 11,280,330 | B2 * | 3/2022 | Liao | F04B 47/024 |
| 11,761,436 | B2 * | 9/2023 | Liao | F04B 23/025 137/565.01 |
| 2006/0027608 | A1 * | 2/2006 | Chen | F04B 33/00 222/401 |
| 2012/0107161 | A1 * | 5/2012 | Sun | F04B 33/00 417/482 |
| 2015/0367301 | A1 * | 12/2015 | Vogt | B01F 35/712 366/139 |
| 2019/0309739 | A1 * | 10/2019 | Liao | F04B 9/14 |
| 2020/0094277 | A1 * | 3/2020 | Liao | B05B 9/0816 |

* cited by examiner

*Primary Examiner* — Thomas Fink
(74) *Attorney, Agent, or Firm* — Egbert, McDaniel & Swartz, PLLC

(57) ABSTRACT

Disclosed is a manually operated dual-action suction/delivery fluid pump and component assembly thereof. The dual-action fluid pump has a fluid container, a cover, a pump unit, and a control valve, wherein the fluid container serves as a reservoir for containing fluid connected to a fluid-conducting pipe. The cover is removably attached to the fluid container connecting the pump unit having a cylinder chamber with a piston. The control valve is horizontally positioned on the cover. By manipulating the control valve to reciprocate, it can be actuated to either draw air out of the fluid container or pump air into the fluid container, facilitating the fluid to enter the fluid container via the fluid-conducting pipe or pump it out of the fluid container.

6 Claims, 10 Drawing Sheets

MANUALLY OPERATED DUAL-ACTION SUCTION/DELIVERY FLUID PUMP AND COMPONENT ASSEMBLY THEREOF

FIELD OF THE INVENTION

The present invention relates to a device for pumping and delivering fluids; more particularly, it refers to a manually operated dual-action suction/delivery fluid pump and component assembly thereof.

BACKGROUND OF THE INVENTION

A dual-action suction and delivery pump which can be used to pump fluid from a container space or to deliver fluid to the container space, comprising a base, a fluid container, a pump unit, and a control valve, wherein the fluid container is vertically positioned at the upper end of the base, and the interior of the fluid container is formed into a fluid reservoir space for containing fluid. The fluid container is provided with a cover connected to a conducting pipe, a fluid-conducting pipe, and an air-conducting pipe. The conducting pipe and the fluid-conducting pipe are communicated with each other, the conducting pipe extends to the outside of the fluid container and the fluid-conducting pipe enters the fluid container space, fluid flows into or out of the fluid reservoir space via the conducting pipe and the fluid-conducting pipe. The air-conducting pipe is communicated with the fluid reservoir space, the pump unit is positioned vertically at the upper end of the base, and both the pump unit and the fluid container are arranged in parallel. A piston is equipped within the pump unit, and the piston controls the air inflow or outflow of the pump unit.

The control valve is disposed adjacent to one side of the pump unit, the control valve has an elongated valve casing, and a valve chamber is formed inside the valve casing; a first air-conducting port is formed on one side of the valve casing to communicate with the valve chamber, and a first air-supplying port and a second air-supplying port are formed on the other side of the valve casing to communicate with the valve chamber, respectively. The air-conducting pipe is connected to the first air-conducting port, allowing air to flow through the air-conducting pipe between the valve chamber and the fluid reservoir space. A first air-supplying pipe is communicated with the first air-supplying port, and air flows between a first chamber and the valve chamber, and a second air-supplying pipe is communicated with the second air-supplying port, and air flows between a second chamber and the valve chamber. A valve stem is provided in the valve chamber, one end of the stem extending out of the valve casing for connecting to an operating unit; the stem is encircled with two separate rings, each of which is axially configured to be spaced apart along the axis of the stem and each of which radially pressing against a side wall of the valve chamber.

Changing the axial position of the valve stem, together with the operation of a shaft rod, causes the piston to reciprocate and displace to draw air from or pump air into the fluid reservoir space, creating a negative or positive pressure in the fluid reservoir space, and then selectively draw fluid through the conducting pipe and the fluid-conducting pipe to enter the fluid reservoir space or pump fluid from the fluid reservoir space to the outside.

The first air-conducting port is in communication with one side of the valve chamber, while the first and second air-supplying ports are connected to the opposite side of the valve chamber, resulting in intricate pipeline configurations to facilitate air flow between the fluid container, pump unit, and control valve.

The fluid container and the pump unit are positioned in parallel on the base, and the manufacturer usually chooses to manufacture the fluid container with a larger capacity to meet different usage needs, whose total volume is larger, which is not conducive to storage and transportation, and in case the fluid container cracks or leaks, the user can only purchase a new dual-action fluid pump, the pump unit and the control valve of the original dual-action fluid pump, even if they are not been damaged, can no longer be used.

When replacing engine oil and other automotive fluids, if only a dual-action fluid pump is available, after extracting the waste fluid to be replaced, it is necessary to disconnect the conducting pipe, the fluid-conducting pipe, and the air-conducting pipe from the cover, then open the cover to drain the fluid to be replaced from the fluid container to the outside, clean the fluid container, and then fill a new fluid into the container. After the cover is restored and reattached to the fluid container, so as the conducting pipe, fluid-conducting pipe, and air-conducting pipe are connected to the cover, the control valve and pump unit then can be operated to fill the container space with the new fluid. The operation is cumbersome and the operation time for replacing the fluid is relatively long. Users who frequently need to perform the fluid replacement operation usually choose to be equipped with multiple dual-action fluid pumps for drawing and pumping the fluid, respectively, in order to reduce the operation time for replacing the fluid, and the multiple dual-purpose pumps with the fluid container, respectively, have a large capacity, which also increases the load on the storage space.

These and other objects and advantages of the present invention will become apparent from a reading of the attached specification and appended claims.

BRIEF SUMMARY OF THE INVENTION

The main purpose of the present invention is to provide a manually operated dual-action suction/delivery fluid pump and component assembly thereof. To address the aforementioned purpose, the present invention employs the following technical solutions:

A manually operated dual-action suction/delivery fluid pump, comprising a fluid container, wherein a fluid reservoir space is formed in the interior of the fluid container. An opening is formed at the upper end of the fluid container, and the fluid reservoir space extends to the opening, and wherein a fluid-conducting pipe extends into the fluid reservoir space and extends out of the fluid container to conduct a fluid into or out of the fluid reservoir space.

A cover, is removably attached to the fluid container and seals the opening of the container. The cover features a first side and a second side, both of which are opposite to each other along the thickness direction of the cover, and the first side faces the fluid reservoir space. The cover is provided with an air conducting channel, a first air-supplying pipe, a second air-supplying pipe, and a third air-supplying pipe, which are connected to the first side, respectively, wherein the first air-supplying pipe is communicated with the air conducting channel, and the second air-supplying pipe is communicated with the fluid reservoir space.

A pump unit, is attached to the cover and is disposed on the first side. The interior of the pump unit forms a cylinder chamber, a piston providing a unidirectional passage of a gas is disposed in the cylinder chamber, the piston divides the cylinder chamber into a first chamber and a second chamber. The piston is connected to a shaft rod which extends out of the cover and is connected to a handle, the operation of which allows the piston to reciprocate along the cylinder chamber to change the volume of the first chamber and the second chamber, and the air passes unidirectionally through the piston from the first chamber to the second chamber, the first chamber communicating with the air conducting channel and the second chamber communicating with the third air-supplying pipe;

A control valve, is horizontally positioned on the second side. The control valve comprises a tubular valve casing and a valve stem, the valve casing is attached to the cover, the valve casing internally forms a valve chamber which communicates with the outside space through the two ends of the valve casing. The valve casing forms an annular wall, a first passage, a second passage, and a third passage, wherein the annular wall annularly surrounds the valve chamber in a radial direction, and the first passage, the second passage, and the third passage extend toward the same direction side of the annular wall to communicate with the valve chamber, respectively. The first passage, the second passage, and the third passage are selected to extend toward the side of the annular wall facing the fluid reservoir space. The first passage, the second passage, the third passage, and the two ends of the valve chamber are spaced along the axial direction of the valve casing, and the second passage is located between the first passage and the third passage, the first passage being in communication with the first air-supplying pipe, the second passage being in communication with the second air-supplying pipe, and the third passage being in communication with the third air-supplying pipe.

A valve stem, is axially and reciprocally displaceable in the valve chamber, wherein two ends of the valve stem extend axially to the outside of the valve casing to form a first operating unit and a second operating unit. The valve stem radially and annularly encircling a first anti-leakage ring, a second anti-leakage ring, and a third anti-leakage ring, wherein the first anti-leakage ring is located between the first passage and the first operating unit, whereby the first anti-leakage ring can be selected to press or not to press against the annular wall, thereby converting the first passage to selectively communicate or not to communicate with the space outside of the valve casing through the valve chamber. Wherein the second anti-leakage ring is located between the first passage and the third passage, the second anti-leakage ring pressing against the annular wall, whereby the second passage can be selectively connected to either the first passage or the third passage through the valve chamber. The third anti-leakage ring is located between the third passage and the second operating unit, whereby the third anti-leakage ring can be selected to press or not to press against the annular wall, thereby converting the third passage to selectively communicate or not to communicate with the space outside of the valve casing through the valve chamber.

The main effect and advantage of the present invention is that the first passage, the second passage, and the third passage extend toward the same direction side of the annular wall and communicate with the valve chamber, the path for providing air flow between the cover, the pump unit, and the control valve is streamlined, and the pump unit and the control valve are connected to the cover, respectively, the whole pipeline is conveniently configured with low complexity. The cover, the pump unit, the control valve, the first air-supplying pipe, the second air-supplying pipe, and the air-supplying pipe form an integral component assembly, and the assembly can be separated from the fluid container, thereby increasing the convenience of cleaning or replacing the fluid container, the replacement of the fluid can be easily carried out, and the assembly can be connected to the fluid container with a corresponding capacity according to the need for use, thereby reducing the space occupied for storage or transportation.

DETAILED DESCRIPTION OF THE INVENTION

Figure 1:
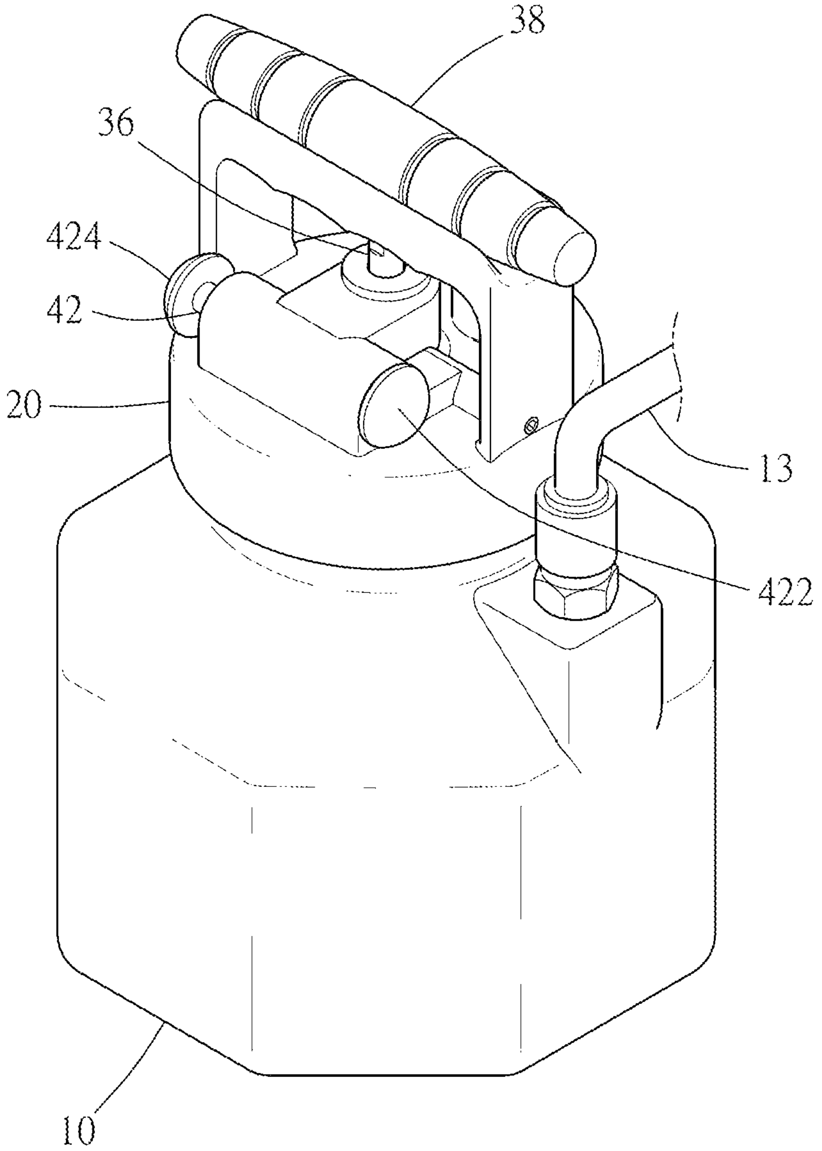
FIG. 1 is a perspective view of a preferred embodiment of the present invention.
Figure 2:
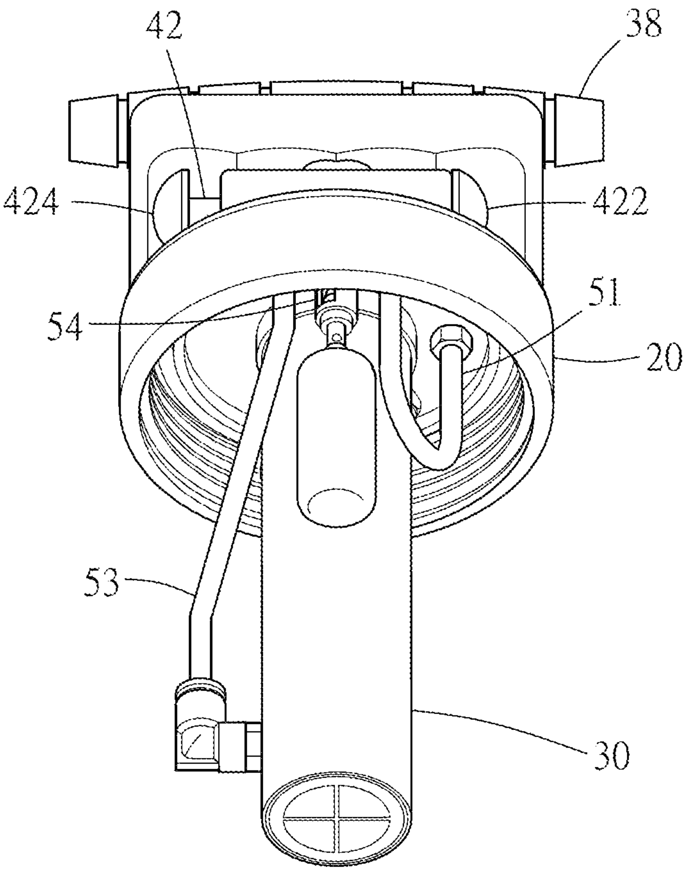
FIG. 2 is another perspective view of a preferred embodiment of the present invention, showing the preferred embodiment with the fluid container removed.
Figure 3:
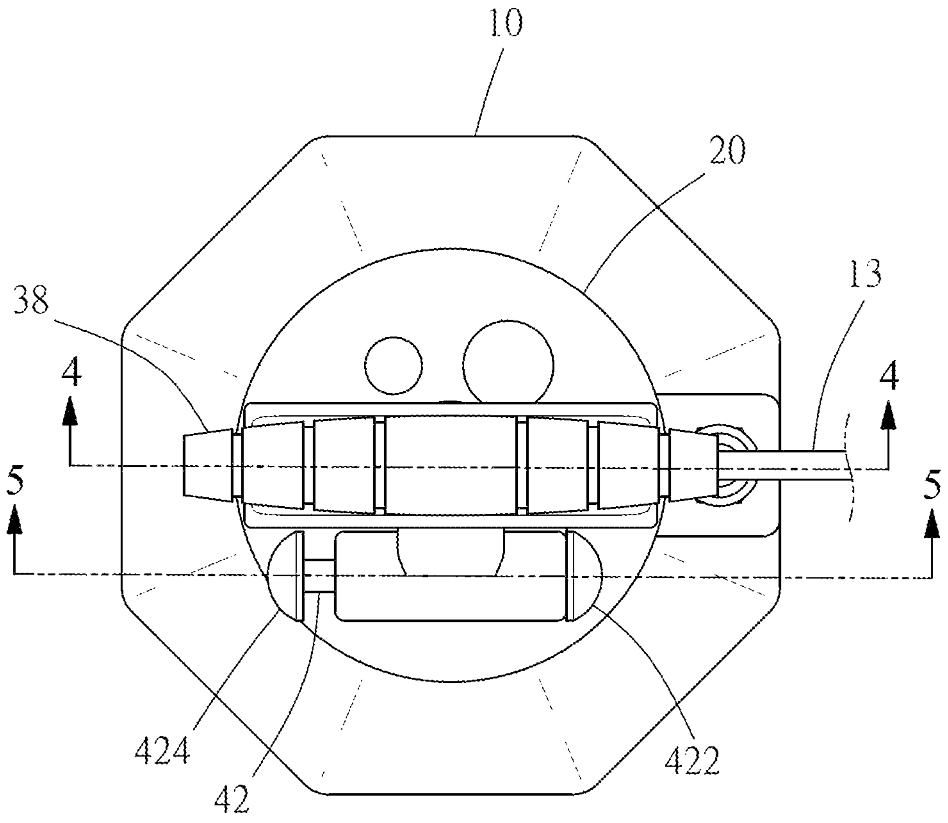
FIG. 3 is a top view of a preferred embodiment of the present invention.
Figure 4:
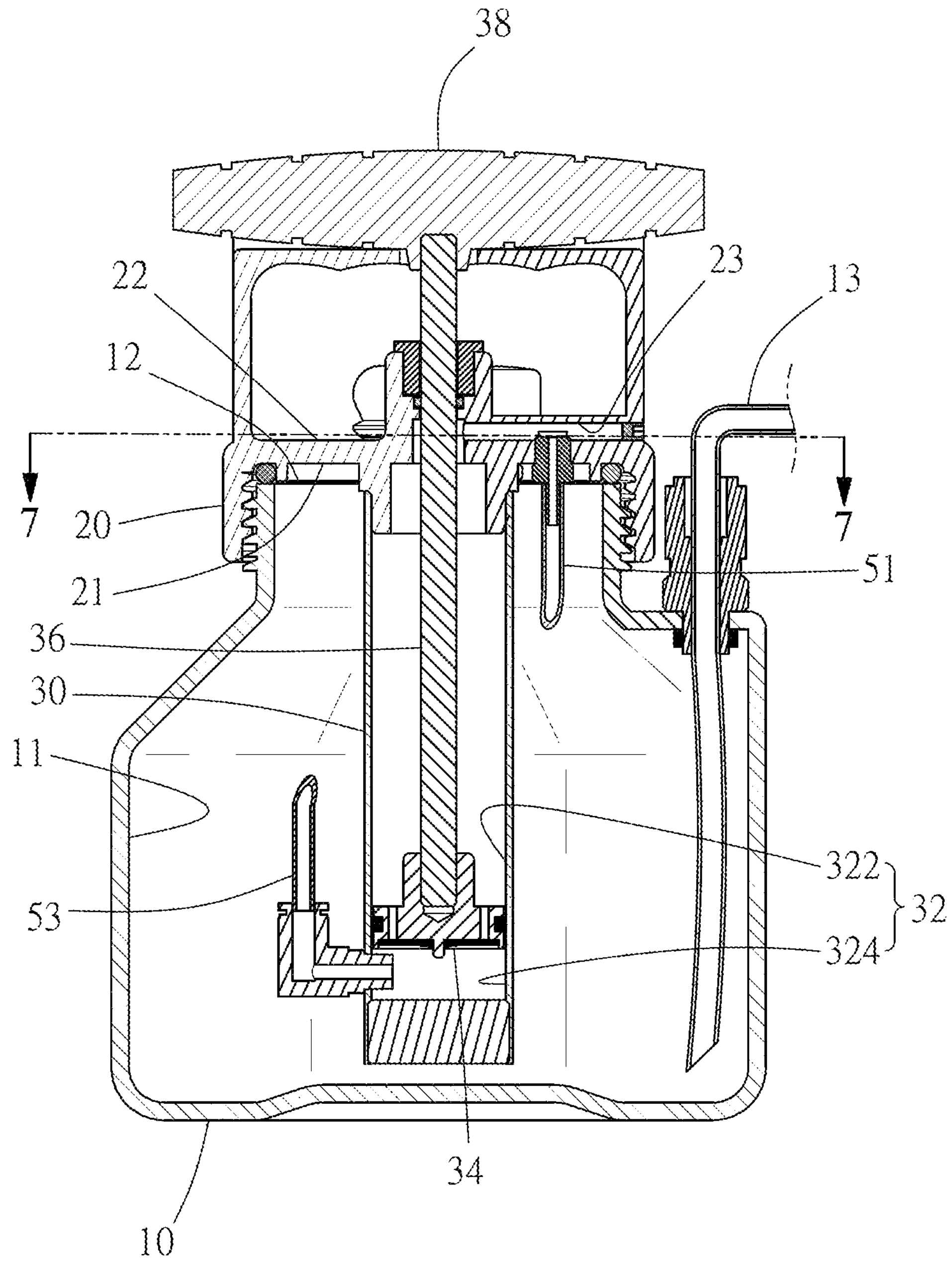
FIG. 4 is a cross-sectional view of a preferred embodiment of the present invention, showing the 4-4 section of FIG. 3.

As shown in FIGS. 1 to 9, a preferred embodiment of a manually operated dual-action fluid pump comprising a fluid container 10, a cover 20, a pump unit 30, and a control valve 40, wherein a fluid reservoir space 11 is formed in the interior of the fluid container 10, an opening 12 is formed at the upper end of the fluid container 10, and the fluid reservoir space 11 extends to the opening 12; wherein a fluid-conducting pipe 13 extends into the fluid reservoir space 11 and extends out of the fluid container 10 to conduct a fluid 90 into or out of the fluid reservoir space 11.

The cover 20 is removably attached to the fluid container 10 and seals the opening 12 of the container, the cover 20 features a first side 21 and a second side 22, both of which are opposite to each other along the thickness direction of the cover 20, and the first side 21 faces the fluid reservoir space 11.

The cover 20 is provided with an air conducting channel 23, a first air-supplying pipe 51, a second air-supplying pipe 52, and a third air-supplying pipe 53, which are connected to the first side 21, respectively, wherein the first air-supplying pipe 51 is communicated with the air conducting channel 23, and the second air-supplying pipe 52 is communicated with the fluid reservoir space 11. Specifically, the second air-supplying pipe 52 is selected to communicate with the fluid reservoir space 11 by radially passing through the two through holes 54.

The pump unit 30 is attached to the cover 20 and is disposed on the first side 21, the interior of the pump unit 30 forms a cylinder chamber 32, a piston 34 providing a unidirectional passage of a gas is disposed in the cylinder chamber 32, the piston 34 divides the cylinder chamber 32 into a first chamber 322 and a second chamber 324, and the gas can pass unidirectionally from the first chamber 322 through the piston 34 into the second chamber 324. The piston 34 is connected to a shaft rod 36 which extends out of the cover 20 and is connected to a handle 38, the operation of which allows the piston 34 to reciprocate along the cylinder chamber 32 to change the volume of the first chamber 322 and the second chamber 324, and the air passes unidirectionally through the piston 34 from the first chamber 322 to the second chamber 324, the first chamber 322 communicating with the air conducting channel 23 and the second chamber 324 communicating with the third air-supplying pipe 53. Since the piston 34 for the unidirectional passage of air is an established technology familiar to those skilled in the art, the specific composition of the piston 34 is not described in detail in the present invention.

The control valve 40 is horizontally positioned on the second side 22, the control valve 40 comprises a tubular valve casing 41 and a valve stem 42, the valve casing 41 is attached to the cover 20.

The valve casing 41 internally forms a valve chamber 43 which communicates with the outside space through the two ends of the valve casing 41. The valve casing 41 forms an annular wall 44, a first passage 411, a second passage 412, and a third passage 413, wherein the annular wall 44 annularly surrounds the valve chamber 43 in a radial direction, and the first passage 411, the second passage 412, and the third passage 413 extend toward the same direction side of the annular wall 44 to communicate with the valve chamber 43, respectively. More specifically, the first passage 411, the second passage 412, and the third passage 413 are selected to extend toward the side of the annular wall 44 facing the fluid reservoir space 11, the first passage 411, the second passage 412, the third passage 413, and the two ends of the valve chamber 43 are spaced along the axial direction of the valve casing 41, and the second passage 412 is located between the first passage 411 and the third passage 413, the first passage 411 being in communication with the first air-supplying pipe 51, the second passage 412 being in communication with the second air-supplying pipe 52, and the third passage 413 being in communication with the third air-supplying pipe 53.

The valve stem 42 is axially and reciprocally displaceable in the valve chamber 43, wherein two ends of the valve stem 42 extend axially to the outside of the valve casing 41 to form a first operating unit 422 and a second operating unit 424, selection of either the first operating unit 422 or the second operating unit 424 can cause the valve stem 42 to be axially and reciprocally displaceable. The valve stem 42 radially and annularly encircling a first anti-leakage ring 61, a second anti-leakage ring 62, and a third anti-leakage ring 63, wherein the first anti-leakage ring 61 is located between the first passage 411 and the first operating unit 422, whereby the first anti-leakage ring 61 can be selected to press or not to press against the annular wall 44, thereby converting the first passage 411 to selectively communicate or not to communicate with the space outside of the valve casing 41 through the valve chamber 43; wherein the second anti-leakage ring 62 is located between the first passage 411 and the third passage 413, with the radial periphery of that second anti-leakage ring 62 pressing against the annular wall 44, whereby the second passage 412 can be selectively connected to either the first passage 411 or the third passage 413 through the valve chamber 43.

Wherein the third anti-leakage ring 63 is located between the third passage 413 and the second operating unit 424, whereby the third anti-leakage ring 63 can be selected to press or not to press against the annular wall 44, thereby converting the third passage 413 to selectively communicate or not to communicate with the space outside of the valve casing 41 through the valve chamber 43.

Figure 6:
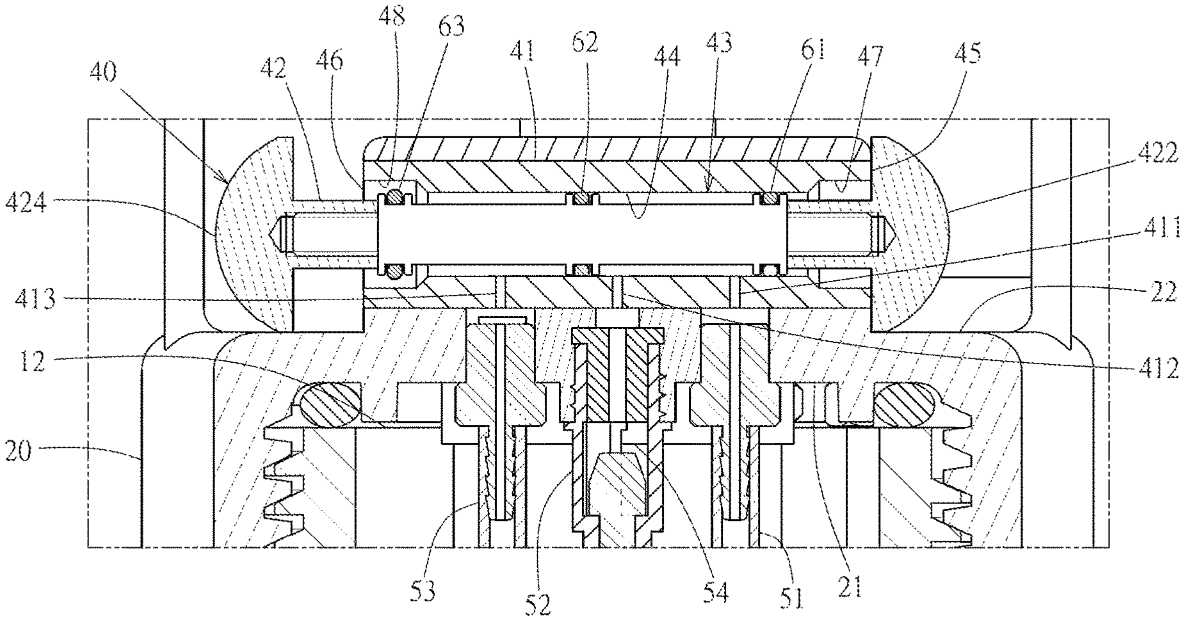
FIG. 6 is a partially enlarged view of FIG. 5, showing a part of the control valve.
Figure 7:
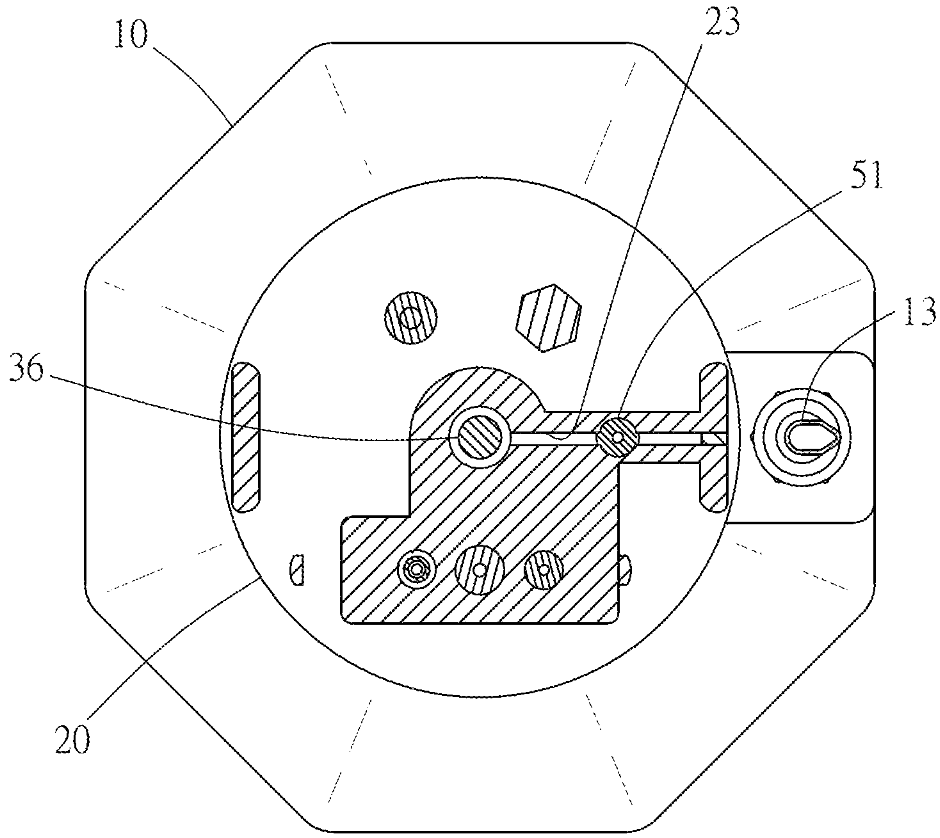
FIG. 7 is a cross-sectional view of a preferred embodiment of the present invention, showing the 7-7 section of FIG. 4.
Figure 8:
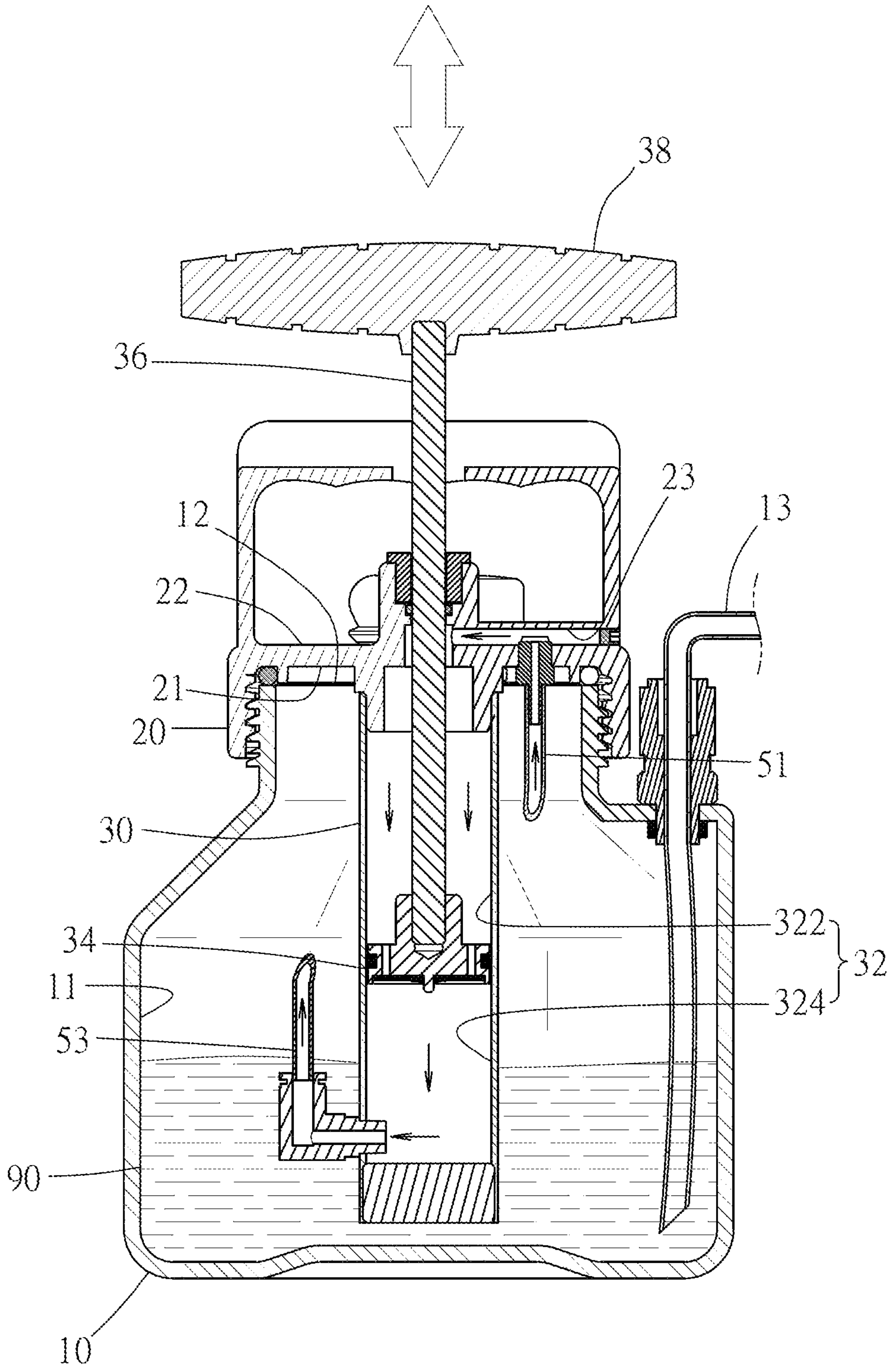
FIG. 8 is a cross-sectional view of a preferred embodiment of the present invention in an operation state, showing the operation of the handle to actuate the piston in a reciprocating state.

When the valve stem 42 is in the position shown in FIG. 6, the second anti-leakage ring 62 is positioned between the second passage 412 and the third passage 413, the first passage 411 communicates with the second passage 412 through the valve chamber 43, while the second passage 412 is unable to communicate with the third passage 413 through the valve chamber 43.

When the first anti-leakage ring 61 enters the valve chamber 43 and presses radially against the annular wall 44 to form an airtight seal, the valve chamber 43 is unable to communicate with an external environment through the valve casing 41 facing the directional end of the first operating unit 422.

When the third anti-leakage ring 63 exits from the extent of the annular wall 44, the third anti-leakage ring 63 is not pressed against the annular wall 44, the third passage 413 communicates with the external environment through the valve chamber 43 and the valve casing 41 facing the directional end of the second operating unit 424, and the fluid reservoir space 11 communicates with the first chamber 322 through the second air-supplying pipe 52, the second passage 412, the valve chamber 43, the first passage 411, the first air-supplying pipe 51, and the air conducting channel, and the second chamber 324 communicates with the external environment through the third air-supplying pipe 53 and the valve chamber 43.

Figure 5:
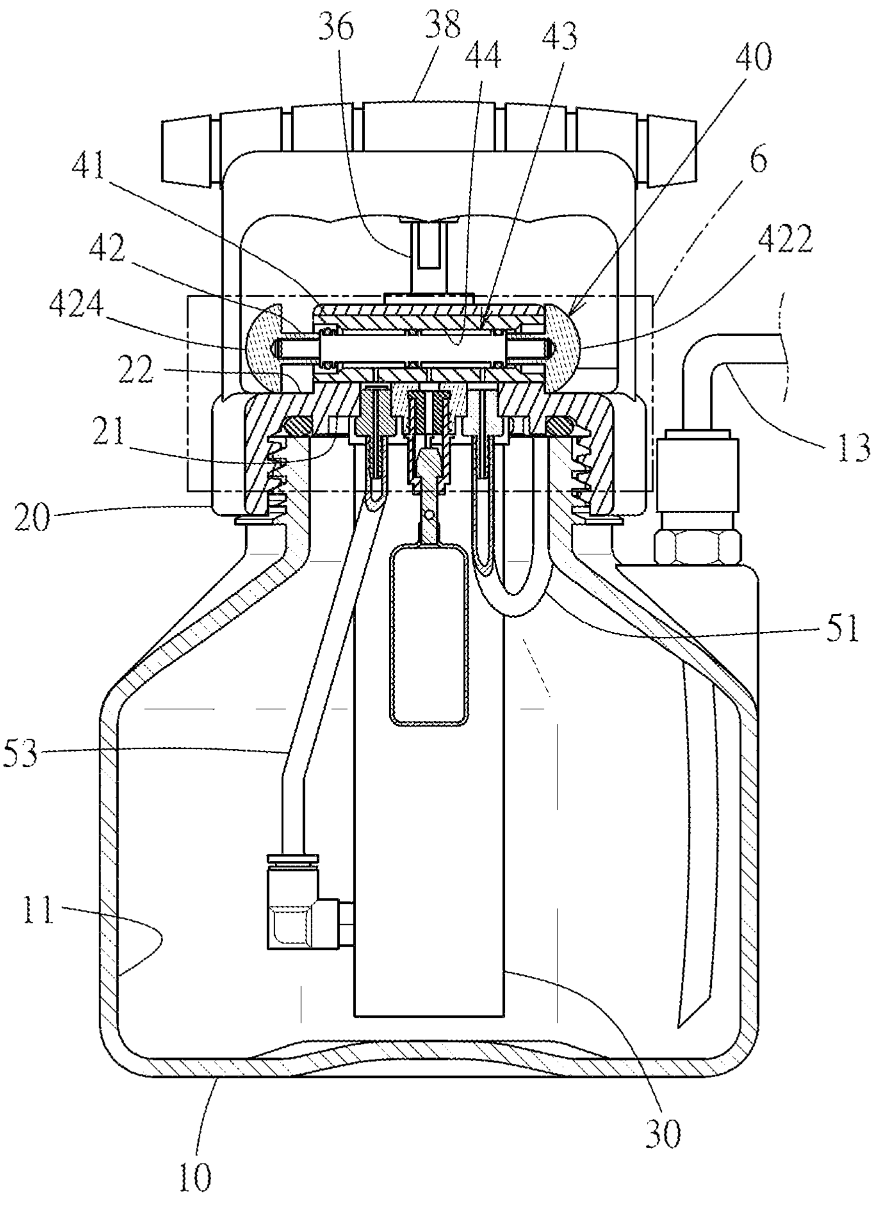
FIG. 5 is a partial cross-sectional view of a preferred embodiment of the present invention, showing the 5-5 section of FIG. 3.

As shown in FIG. 5, the operation of the handle 38 causes the piston 34 to reciprocate and repeatedly change the volume of the first chamber 322 and the second chamber 324, and the air from the fluid reservoir space 11 is attracted to flow into the first chamber 322, and the air from the first chamber 322 passes unidirectionally through the piston 34 to enter the second chamber 324, and is subsequently released to the external environment through the third air-supplying pipe 53 and the valve chamber 43. Since the fluid reservoir space 11 is in a negative pressure state, the fluid 90 can be pumped into the fluid reservoir space 11 from the outside through the fluid-conducting pipe 13.

Figure 9:
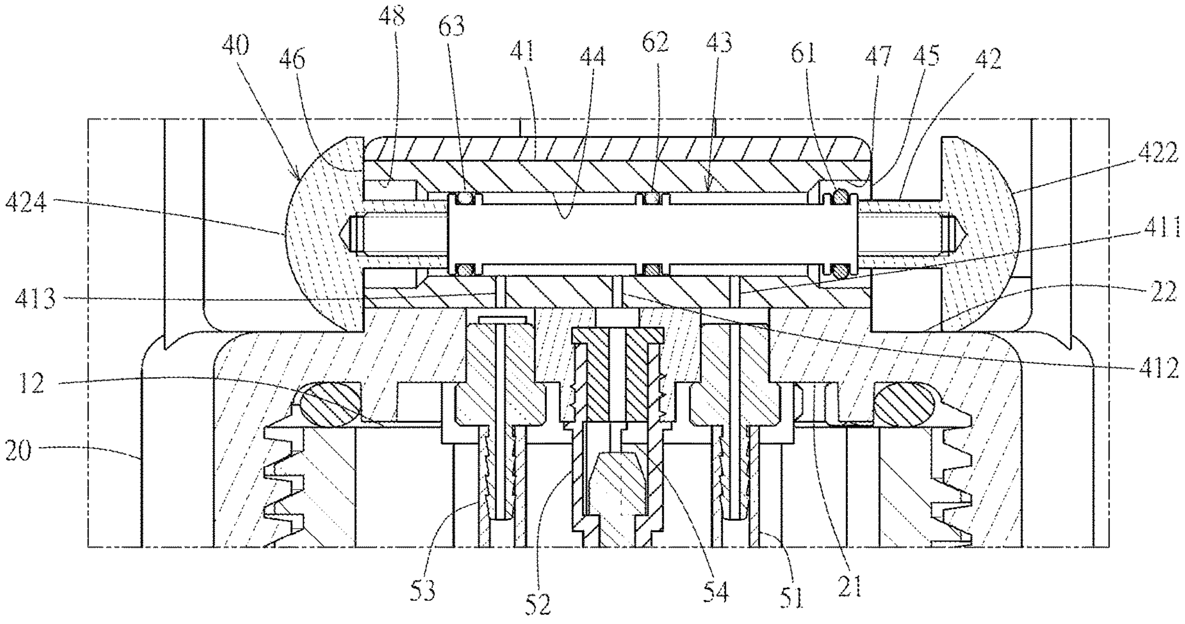
FIG. 9 is a partial cross-sectional view of the control valve of a preferred embodiment of the present invention, showing a state in which, the valve stem is moved to another position.

When the valve stem 42 is in the position shown in FIG. 9, the second anti-leakage ring 62 is positioned between the first passage 411 and the second passage 412, the second passage 412 communicates with the third passage 413 through the valve chamber 43, while the first passage 411 is unable to communicate with the second passage 412 through the valve chamber 43; when the third anti-leakage ring 63 enters the valve chamber 43 and presses radially against the annular wall 44 to form an airtight seal, the valve chamber 43 is unable to communicate with an external environment through the valve casing 41 facing the directional end of the second operating unit 424.

When the first anti-leakage ring 61 exits from the extent of the annular wall 44, the first anti-leakage ring 61 is not pressed against the annular wall 44, the first passage 411 communicates with the external environment through the valve chamber 43 and the valve casing 41 facing the directional end of the first operating unit 422.

The fluid reservoir space 11 communicates with the second chamber 324 through the second air-supplying pipe 52, the second passage 412, the valve chamber 43, the third passage 413, and the third air-supplying pipe 53, and the first chamber 322 communicates with the external environment through the air conducting channel 23, the first air-supplying pipe 51, the first passage 411, and the valve chamber 43.

The operation of the handle 38 causes the piston 34 to reciprocate and repeatedly change the volume of the first chamber 322 and the second chamber 324, and air from the external environment is attracted to enter the valve chamber 43 through one end of the valve casing 41 facing the first operating unit 422, and then flows into the first chamber 322, and the air from the first chamber 322 passes unidirectionally through the piston 34 into the second chamber 324 and is subsequently released into the fluid reservoir space 11 through the third air-supplying pipe 53, the valve chamber 43, and the second air-supplying pipe 52. Since the fluid reservoir space 11 is in a positive pressure state, the fluid 90 stored in the fluid reservoir space 11 is pressurized to flow to the outside through the fluid-conducting pipe 13.

Selecting to push the first operating unit 422 or the second operating unit 424 to change the axial positioning of the valve stem 42 enables selecting to pump air into or out of the fluid reservoir space 11 when the piston 34 is reciprocated by operating the handle 38 to change the state of the fluid reservoir space 11 to a negative pressure state or a positive pressure state and then selecting to attract the fluid 90 into the fluid reservoir space 11 or to pump the fluid 90 out of the fluid reservoir space 11 via the fluid-conducting pipe 13.

The first passage 411, the second passage 412, and the third passage 413 extend to the same side of the annular wall 44, respectively, and the path for providing air flow between the cover 20, the pump unit 30, and the control valve 40 is streamlined.

The pump unit 30 and the control valve 40 are connected to the cover 20, respectively, allowing the first air-supplying pipe 51, the second air-supplying pipe 52, and the third air-supplying pipe 53 to be connected to the first side 21, respectively, making the whole pipeline configuration convenient with low complexity. The cover 20, the pump unit 30, the control valve 40, the first air-supplying pipe 51, the second air-supplying pipe 52, and the third air-supplying pipe 53 form an integral component assembly, and the fluid container 10 can be easily cleaned by separating the cover 20 from the fluid container 10 without disassembling the pump unit 30 or the control valve 40, or disassembling the first air-supplying pipe 51, the second air-supplying pipe 52, or the third air-supplying pipe 53.

The component assembly described above can choose to configure the fluid container 10 with the corresponding capacity to form the dual-action fluid pump for suction and delivery according to different usage needs, and the user does not need to choose the dual-action fluid pump to equip with a large capacity of the fluid container 10, which is favorable to the overall storage and transportation, and when the fluid container 10 develops a crack or leak, it is only necessary to select the replacement of the fluid container 10 which can be cooperatively connected with the cover 20, and the cover 20, the pump unit 30, the control valve 40, the first air-supplying pipe 51, the second air-supplying pipe 52, and the third air-supplying pipe 53 can all continue to be used. 20.

The user may choose to have multiple fluid containers 10 corresponding to one of the described assemblies so that when the fluid 90 to be replaced is drawn out, the component assembly is assembled with one of the fluid containers 10, and when the new fluid 90 is filled into the container space described in the prior art, the component assembly can be moved to combine with another of the fluid containers 10 having the fluid 90 therein, so that the replacement of the fluid 90 is convenient and easy.

The distance between the first anti-leakage ring 61 and the third anti-leakage ring 63 is greater than the distance between the first passage 411 and the third passage 413.

The two ends of the valve casing 41 constrain the first operating unit 422 and the second operating unit 424, respectively, thereby limiting the axial displacement of the valve stem 42.

One axial end of the valve casing 41 is defined as a first end 45 and the other end is defined as a second end 46, wherein the first end 45 is located between the first passage 411 and the first operating unit 422, and the first end 45 is opposed to the first operating unit 422, and the second end 46 is located between the third passage 413 and the second operating unit 424, and the second end 46 is opposed to the second operating unit 424. The first end 45, the first passage 411, the second passage 412, the third passage 413, and the second end 46 are configured sequentially spaced along the axial direction of the valve casing 41.

The interior of the valve casing 41 is formed with a first sub-chamber 47 and a second sub-chamber 48, respectively, communicating with the valve chamber 43, the first sub-chamber 47 being located between the first passage 411 and the first end 45 and the first sub-chamber 47 extending to the first end 45.

The second sub-chamber 48 being located between the third passage 413 and the second end 46 and the second sub-chamber 48 extending to the second end 46. The inner diameter of the first sub-chamber 47 and the second sub-chamber 48 is greater than the outer diameter of the first anti-leakage ring 61 and the third anti-leakage ring 63, respectively, in a free state. Accordingly, when the first anti-leakage ring 61 exits the valve chamber 43, the first anti-leakage valve 61 enters the first sub-chamber 47, and the valve chamber 43 is able to communicate with the external environment through the first sub-chamber 47, and when the third anti-leakage ring 63 exits the valve chamber 43, the third anti-leakage valve 63 enters the second sub-chamber 48, and the valve chamber 43 is able to communicate with the external environment through the second sub-chamber 48.

Figure 10:
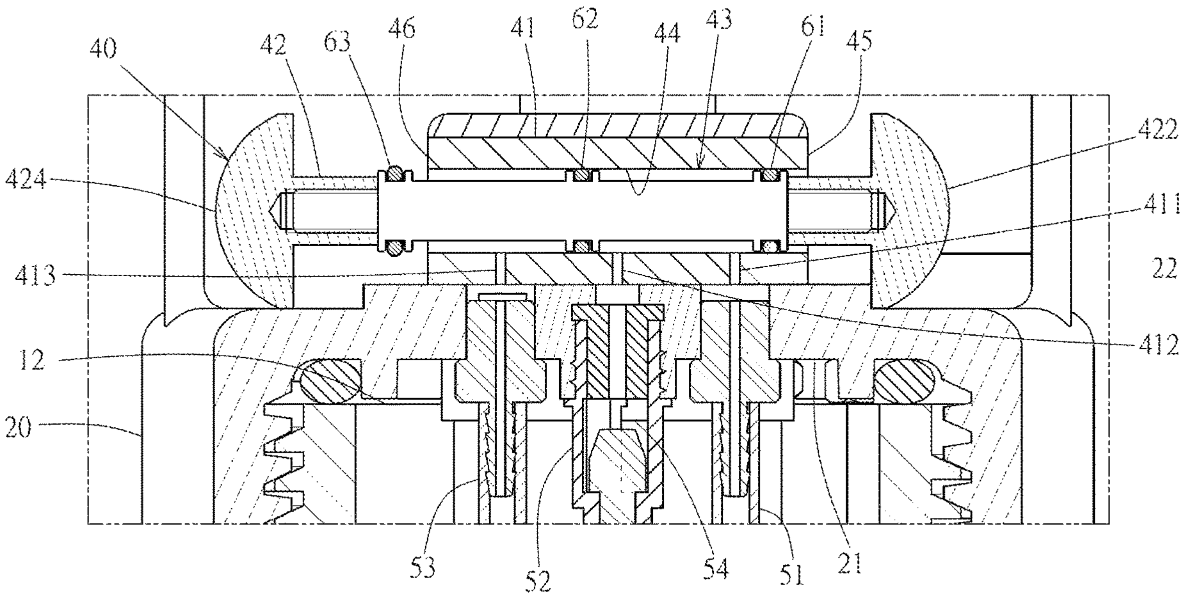
FIG. 10 is a partial sectional view of a variant embodiment of the present invention, showing a part of the control valve.

As shown in FIG. 10, the variant embodiment is based on the preferred embodiment, and the variant embodiment differs from the preferred embodiment primarily in that the valve chamber 43 extends to the first end 45 and the second end 46, and the valve housing 41 does not form the first sub-chamber 47 and the second sub-chamber 48 of the preferred embodiment.

I claim:

1. A manually-operated dual-action suction/delivery fluid pump comprising:

- a fluid container having a fluid reservoir space formed thereon, said fluid container having an opening formed at an upper end thereof, the fluid reservoir space extending to the opening;
- a fluid conducting pipe extending into the fluid reservoir space and extending out of said fluid container, said fluid conducting pipe adapted to conduct a fluid into or out of the fluid reservoir space;
- a cover removably attached to said fluid container so as to seal the opening of said fluid container, said cover having a first side and a second side opposite each other across a thickness of said cover, the first side facing the fluid reservoir space, said cover having an air-conducting channel and a first air-supplying pipe and a second air-supplying pipe and a third air-supplying pipe conducting respectively to the first side, wherein the first air-supplying pipe communicates with the air-conducting channel, the second air-supplying pipe communicating with the fluid reservoir space;

a pump unit attached to said cover and disposed on the first side thereof, said pump unit having a cylinder chamber with a piston adapted to provide a unidirectional passage of gas therein, the piston dividing the cylinder chamber into a first chamber and a second chamber, the piston being connected to a shaft rod that extends outwardly of said cover, the shaft rod connected to a handle, the piston reciprocable in the cylinder chamber so as to change a volume of the first chamber and the second chamber, the first chamber communicating with the air-conducting channel, the second chamber communicating with the third air-supplying pipe; and a control valve positioned on the second side, said control valve having a tubular valve casing and a valve stem, the tubular valve casing attached to said cover, the tubular valve casing defining a valve chamber therein, the valve chamber communicating with an exterior space through opposite ends of the tubular valve casing, wherein the tubular valve casing has an annular wall and a first passage and a second passage and a third passage, the annular wall annularly surrounding the tubular valve casing, the first passage and the second passage and the third passage extending in a common direction toward the annular wall so as to communicate with the tubular valve casing respectively, the first passage and the second passage and the third passage extending toward a side of the annular wall facing the fluid reservoir space, wherein the first passage and the second passage and the third passage are in spaced relation with respect to the tubular valve casing, the second passage positioned between the first passage and the third passage, the first passage being in fluid communication with the first air-supplying pipe, the second passage being in communication with the second air-supplying pipe, the third passage being in communication with the third air-supplying pipe, wherein the valve stem of said control valve is reciprocably displaceable in the valve chamber, wherein opposite ends of the valve stem extend to an exterior of said tubular valve casing so as to define a first operating unit and a second operating unit, the valve stem radially and annularly encircling a first anti-leakage ring and a second anti-leakage ring and a third anti-leakage ring, the first anti-leakage ring positioned between the first passage and the first operating unit, the first anti-leakage ring being selectively urging or not urging against the annular wall so as to allow the first passage to communicate or to not communicate with the exterior of the tubular valve casing through the valve chamber, the third anti-leakage ring positioned between the third passage and the second operating unit, the third anti-leakage ring selectively urging or not urging against the annular wall so as to allow the third passage to communicate or not communicate with the exterior of the valve casing through the valve chamber.

2. The manually-operated dual action suction/delivery fluid pump of claim 1, wherein a distance between the first anti-leakage ring and the third anti-leakage ring is greater than a distance between the first passage and the third passage.

3. The manually-operated dual action suction/delivery fluid pump of claim 1, wherein the opposite ends of the tubular valve casing are a first end and a second end respectively, the first end being positioned between the first passage and the second operating unit, the second end being positioned between the third passage and the second operating unit, the tubular valve casing having a first sub-chamber and a second sub-chamber respectively communicating with the valve chamber, the first sub-chamber positioned between the first passage and the first end, the first sub-chamber extending to the first end, the second sub-chamber positioned between the third passage and the second end, the second sub-chamber extending to the second end, wherein an inner diameter of first sub-chamber and the second sub-chamber is greater than an outer diameter of the first anti-leakage ring and the third anti-leakage ring respectively.

4. A component assembly of a manually-operated dual-action suction/delivery fluid pump used in combination with a fluid container, the compartment assembly comprising:

a cover adapted to connect with the fluid container, said cover having a first side and a second side opposite each other across a thickness of said cover, the first side facing the fluid reservoir space, said cover having an air-conducting channel and a first air-supplying pipe and a second air-supplying pipe and a third air-supplying pipe conducting respectively to the first side, wherein the first air-supplying pipe communicates with the air-conducting channel, the second air-supplying pipe communicating with the fluid reservoir space;

a pump unit attached to said cover and disposed on the first side thereof, said pump unit having a cylinder chamber with a piston adapted to provide a unidirectional passage of gas therein, the piston dividing the cylinder chamber into a first chamber and a second chamber, the piston being connected to a shaft rod that extends outwardly of said cover, the shaft rod connected to a handle, the piston reciprocable in the cylinder chamber so as to change a volume of the first chamber and the second chamber, the first chamber communicating with the air-conducting channel, the second chamber communicating with the third air-supplying pipe; and a control valve positioned on the second side, said control valve having a tubular valve casing and a valve stem, the tubular valve casing attached to said cover, the tubular valve casing defining a valve chamber therein, the valve chamber communicating with an exterior space through opposite ends of the tubular valve casing, wherein the tubular valve casing has an annular wall and a first passage and a second passage and a third passage, the annular wall annularly surrounding the tubular valve casing, the first passage and the second passage and the third passage extending in a common direction toward the annular wall so as to communicate with the tubular valve casing respectively, the first passage and the second passage and the third passage extending toward a side of the annular wall facing the fluid reservoir space, wherein the first passage and the second passage and the third passage being in spaced relation with respect to the tubular valve casing, the second passage positioned between the first passage and the third passage, the first passage being in fluid communication with the first air-supplying pipe, the second passage being in communication with the second air-supplying pipe, the third passage being in communication with the third air-supplying pipe, wherein the valve stem of said control valve is reciprocably displaceably in the valve chamber, wherein opposite ends of the valve stem extend to an exterior of said tubular valve casing so as to define a first operating unit and a second operating unit, the valve stem radially and annularly encircling a first anti-leakage ring and a second anti-leakage ring and a third anti-leakage ring, the first anti-leakage ring positioned between the first passage and the first operating unit, the first anti-leakage ring being selectively urging or not urging against the annular wall so as to allow the first passage to communicate or to not communicate with the exterior of the tubular valve casing through the valve chamber, the third anti-leakage ring positioned between the third passage and the second operating unit, the third anti-leakage ring selectively urging or not urging against the annular wall so as to allow the third passage to communicate or not communicate with the exterior of the valve casing through the valve chamber.

5. The compartment assembly of claim 4, wherein a distance between the first anti-leakage ring and the third anti-leakage ring is greater than a distance between the first passage and the third passage.

6. The compartment assembly of claim 4, wherein the opposite ends of the tubular valve casing are a first end and a second end respectively, the first end being positioned between the first passage and the second operating unit, the second end being positioned between the third passage and the second operating unit, the tubular valve casing having a first sub-chamber and a second sub-chamber respectively communicating with the valve chamber, the first sub-chamber positioned between the first passage and the first end, the first sub-chamber extending to the first end, the second sub-chamber positioned between the third passage and the second end, the second sub-chamber extending to the second end, wherein an inner diameter of first sub-chamber and the second sub-chamber being greater than an outer diameter of the first anti-leakage ring and the third anti-leakage ring respectively.

* * * * *